April 1, 1924.
W. A. GIBBS
ANIMAL TRAP
1,489,120
Filed Nov. 12, 1920     2 Sheets-Sheet 2
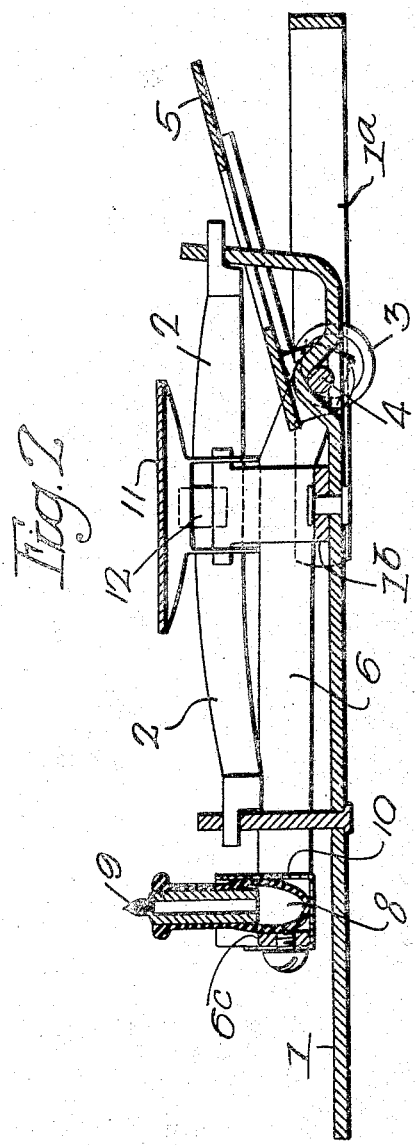
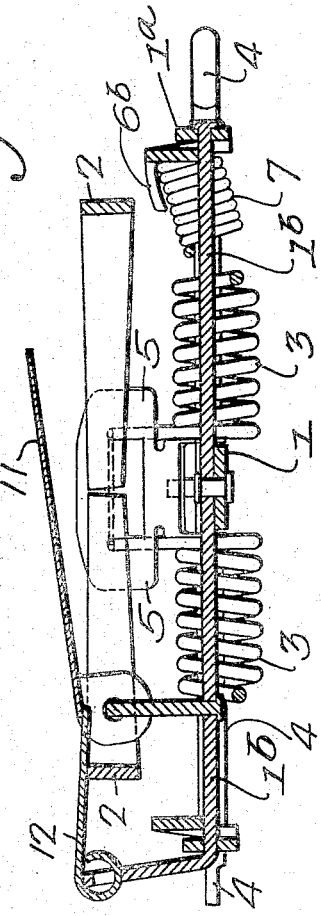
Inventor-
Walter A. Gibbs.
by his Attorneys
Howson & Howson Patented Apr. 1, 1924.

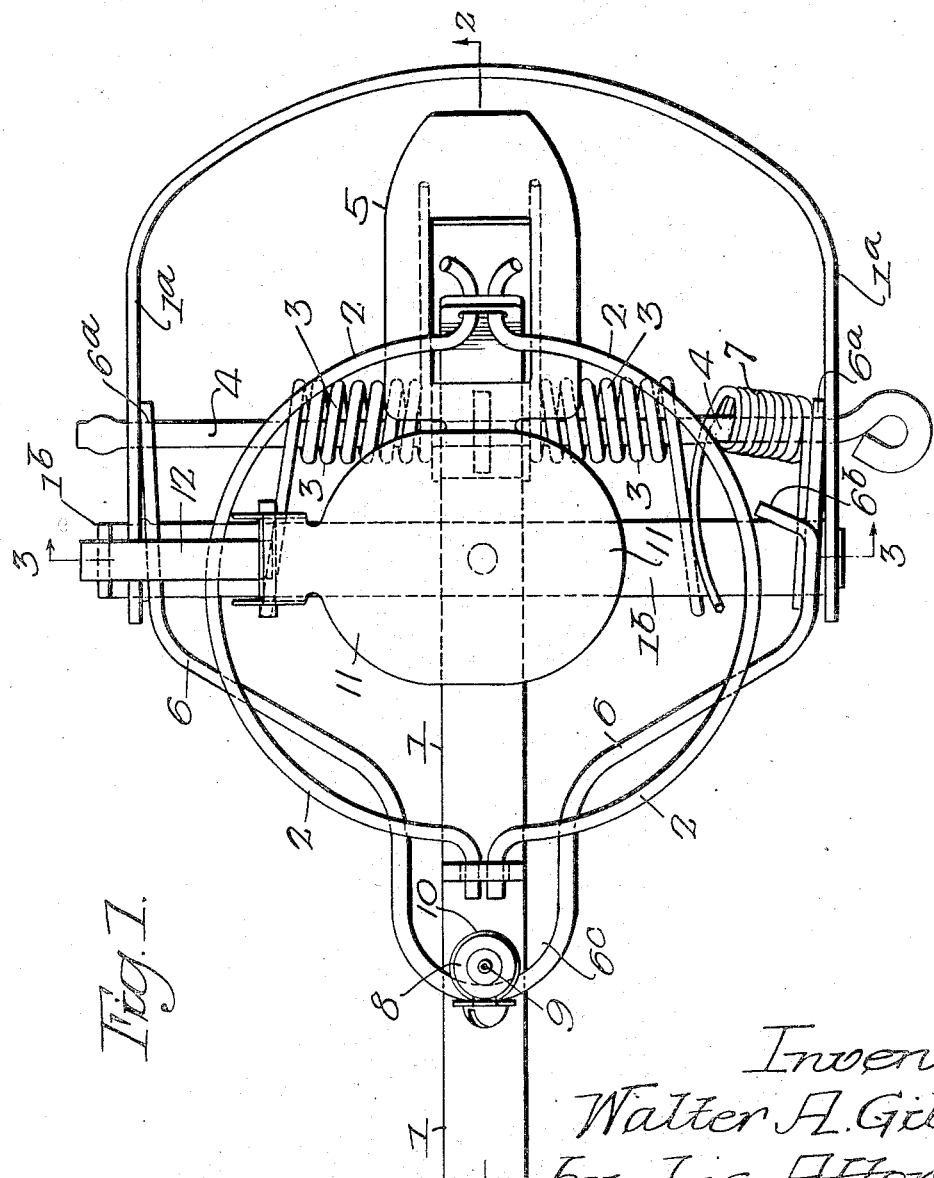

1,489,120

UNITED STATES PATENT OFFICE.

WALTER A. GIBBS, OF WILMINGTON, DELAWARE.

ANIMAL TRAP.

Application filed November 12, 1920. Serial No. 423,664.

*To all whom it may concern:*

Be it known that I, WALTER A. GIBBS, a citizen of the United States, residing in Wilmington, New Castle County, Delaware, have invented certain Improvements in Animal Traps, of which the following is a specification.

The primary object of my invention is to provide mechanical means, automatically operable, for administering to an animal a hypodermic injection; a further object of the invention being to provide animal trapping mechanism with means for automatically administering an injection to any animal caught thereby.

The devices by means of which these, and other objects hereinafter brought out, are accomplished will be more readily understood from the attached drawings, in which:

Figure 1, is a plan view of a trap equipped with my hypodermic device, the trap being shown in the "set" position;

Fig. 2, is a vertical section on the line 2—2, Fig. 1, and

Fig. 3, is a vertical section on the line 3—3, Fig. 1.

With reference to the drawings, 1 indicates the main frame of a trap upon which is pivotally mounted a pair of jaws 2, 2, said jaws being actuated by means of two coiled springs 3, 3, carried in the present instance by a rod 4 which extends between the opposite sides of an extension $1^a$ of the frame. One end of each of the springs 3 is confined beneath the cross piece $1^b$ of the frame, while the opposite ends of the springs underlie a lever arm 5, pivotally mounted in the present instance upon the rod 4, said arm 5 being of the well known form and adapted under the influence of the springs 3 to act upon the jaws 2, 2, to bring them together and to retain them in closed relation.

Pivotally mounted upon the rod 4 in the present instance is an arm 6, said arm preferably being generally of the shape shown with apertures $6^a$ in the ends through which the said rod passes. The arm 6 has operably associated therewith a spring 7 which, in the present instance, is carried by the rod 4, and which has one end thereof overlying the cross piece $1^b$, while the other end engages a projecting lug $6^b$ upon the said arm. The tendency of the spring 7 is to carry the arm forwardly from the position in which it is shown in Fig. 1 into a position overlying the extension $1^a$ of the frame. The arm 6 is preferably so shaped that when it is carried forward by the spring 7, a portion of the arm passes closely over the jaws 2, 2, when the latter are in the upright, closed position, the arm in the present instance having a central rounded portion $6^c$ which gives the necessary clearance for the jaws when the said arm is shifted.

Suitably secured to the arm 6, in the present instance to the portion $6^c$ thereof, is a hypodermic syringe comprising in the present instance a rubber bulb 8 having therein a ported needle member 9, while a suitable receptacle or container 10 for the bulb is secured to the arm 6.

Pivotally mounted upon the frame 1 is a treadle 11 which cooperates in the usual manner with a latch member 12, also pivotally attached to the frame, to retain the jaws in open relation. The jaws when open overlie the arm 6, the latter being in the set position, so that the retaining means for the jaws operate through the jaws to retain the arm in set position, the arm being released with the closing of the jaws.

It will now be clear that with the above described device, when an animal becomes caught between the jaws 2, 2, the arm 6 being released carries the syringe forward so that it strikes that portion of the animal gripped by the jaws, the poison or drug contained in the syringe being injected by the force of the concussion into the animal, thereby relieving the pain or killing the animal.

The device described is capable of much modification with no departure from the essential features of the invention. The device for example is entirely operable in the absence of the jaws 2, 2, and may thus be employed to administer a drug without otherwise injuring the animal. Numerous other forms of syringe also may be employed with entire satisfaction, and the forms and proportions of the various elements may be materially altered to suit existing conditions and the particular result desired.

I claim:

1. The combination with means for gripping an animal to prevent escape thereof, of means automatically operative with the gripping means for applying to said animal a drug or poison.

2. The combination with means for gripping an animal to prevent escape thereof, of means for applying to the retained animal a drug or poison, and an animal actuable element for setting the said respective means into operation to grip the animal and to apply the drug or poison thereto.

3. In animal trapping mechanism, the combination with animal gripping means, of means automatically operable subsequent to the operation of the gripping means for applying a drug or poison to the retained animal.

4. The combination with an animal actuable element, of an automatically movable member normally retained in retracted position by said element and adapted to advance into engagement with an animal actuating the element to release the said member, and means carried by the member for applying to said animal a drug or poison.

5. The combination with means for gripping an animal to prevent escape thereof, of means including a hypodermic syringe operatively associated with the gripping means for applying to the retained animal a drug or poison.

6. The combination of a frame, a member pivotally mounted on said frame, a spring for actuating said member, animal releasable means for retaining the member in a given "set" position against the tension of the spring, and a hypodermic injection device carried by said member.

7. The combination with animal trapping mechanism, of means operatively associated with said mechanism for administering to an animal caught thereby a hypodermic injection.

8. In an animal trap, the combination with spring actuated animal retaining jaws, of a hypodermic injection device operatively associated with said jaws for administering a hypodermic to an animal retained thereby.

9. In an animal trap, the combination with a pair of automatically movable jaws, of animal-releasable means for retaining said jaws in open relation, an automatically movable member releasable from a retracted position by closing movement of the jaws, and a hypodermic injection device carried by said member.

10. In an animal trap, the combination with a pair of jaws, actuating springs for said jaws, and animal-releasable means for retaining the jaws in open relation, of a spring-actuated arm releasable from a retracted position by the closing movement of said jaws, and a hypodermic injection device carried by said arm and arranged when the arm is released to strike that portion of an animal gripped by said jaws.

11. The combination with a member automatically movable from a retracted to an advanced position, of animal releasable means for retaining the member in retracted position, and means carried by the member and adapted by contact with an animal to apply to the latter a drug or poison.

12. The combination with means for gripping an animal to prevent escape thereof, of animal actuable means for releasing said gripping means, and means also actuated by the animal for applying thereto a drug or poison.

13. In an animal trap, the combination with a pair of automatically movable jaws, of an automatically movable member, a hypodermic injection device carried by said member, and animal-releaseable means for retaining said jaws in open relation and said member in a retracted position.

WALTER A. GIBBS.